United States Patent [19]

Rojo

[11] 4,149,953
[45] Apr. 17, 1979

[54] APPARATUS FOR REMOVING IMPURITIES FROM WASTE WATER

[75] Inventor: Stephen A. Rojo, Charlotte, N.C.

[73] Assignee: R. H. Bouligny, Inc., Charlotte, N.C.

[21] Appl. No.: 851,110

[22] Filed: Nov. 14, 1977

Related U.S. Application Data

[63] Continuation-in-part of Ser. No. 801,653, May 31, 1977, abandoned.

[51] Int. Cl.² ............................ C02B 1/82; C02C 5/12
[52] U.S. Cl. .................................. 204/269; 204/1 R; 204/149; 204/152; 204/267; 204/268; 204/275; 204/276
[58] Field of Search ............... 204/1 R, 149, 151, 152, 204/275, 276, 267, 268, 269

[56] References Cited

U.S. PATENT DOCUMENTS

| | | | |
|---|---|---|---|
| 2,133,895 | 10/1938 | Kühl | 204/150 |
| 2,399,289 | 4/1946 | Negus | 204/275 |
| 3,192,146 | 6/1965 | Vellas et al. | 204/152 X |
| 3,394,064 | 7/1968 | Fowkes et al. | 204/150 |
| 3,457,152 | 7/1969 | Maloney, Jr. et al. | 204/131 |
| 3,716,459 | 2/1973 | Salter et al. | 204/1 R |
| 3,816,276 | 6/1974 | Ichiki et al. | 204/152 |
| 3,888,756 | 6/1975 | Teshima et al. | 204/149 X |
| 3,966,571 | 6/1976 | Gagnon et al. | 204/152 X |
| 4,014,766 | 3/1977 | Watanabe et al. | 204/152 |

Primary Examiner—Arthur C. Prescott
Attorney, Agent, or Firm—Frailey & Ratner

[57] ABSTRACT

A treating chamber operable as an electrolytic cell is provided, in which the electrodes have large surface areas relative to the volume of the electrolyte. The anode is composed of a quantity of aluminum particles and the cathode is composed of a quantity of iron particles disposed in close proximity to the aluminum. Waste water containing inpurities is introduced into the treating chamber and utilized as the electrolyte. An electric current is applied to the electrodes to dissolve aluminum and iron, and produce floc in the treating chamber. The impurities in the water are adsorbed and retained by the floc. The waste water may be continuously recirculated from the treating chamber to a holding chamber, or may be moved across the aluminum and iron electrodes in a continuous flow-through system at a predetermined flow rate. The floc containing the adsorbed impurities is separated from the water by conventional means. As an alternative, clean water containing normal dissolved solids may be introduced into the treatment chamber and utilized as the electrolyte. An electric current is applied to the aluminum and iron electrodes to produce floc. Floc-laden clean water is conveyed to a chamber containing waste water, and mixed therewith. Floc containing impurities adsorbed from the waste water then is separated from the water by conventional means.

19 Claims, 5 Drawing Figures

Fig. 5

APPARATUS FOR REMOVING IMPURITIES FROM WASTE WATER

CROSS-REFERENCE TO OTHER APPLICATIONS

This application is a continuation-in-part of my pending patent application Ser. No. 801,653 filed May 31, 1977 now abandoned, entitled "Method and Apparatus for Removing Impurities from Polluted Water".

BACKGROUND OF THE INVENTION

It is well-known that industry, government and the general public are aware of the need to preserve and protect the natural environment from the adverse effects caused by polluted industrial effluent which has been, and is currently being, permitted to contaminate the natural environment, particularly rivers and streams where polluted industrial waste water is simply dumped in untreated form. As a result, national and local regulations have been adopted, with increasing strict standards, to reduce or eliminate the undesirable environmental impact of industrial waste, and industry is constantly faced with the problem of meeting the requirements of these regulations while maintaining the cost of waste processing within acceptable limits.

In attempting to meet this challenge, a wide variety of chemical processing is used to treat industrial waste water by causing the impurities therein to react with chemical additives whereby the impurities are reformed as harmless chemical compounds, or the impurities are caused to flocculate so that they can be separated mechanically, as by filtering. Generally, however, many impurities, particularly heavy metals, must be treated separately with different chemical additives, all of which is relatively time consuming and expensive. Additionally, while chemical treating will usually remove the great majority of impurities, it is not uncommon for small, but still undesirable, quantities of the impurities to remain in the water after it has been chemically treated. Finally, it is often necessary to process further the chemically treated water, before it can be added to natural water supplies, to compensate for the adverse effects created by the chemical treatment itself.

Electrolytic cells have been employed to purify waste water utilizing iron or aluminum electrodes in rod or plate form for the production of flocculent precipitates, in the form of iron or aluminum hydroxide, which adsorb impurities in the water. Such techniques are referred to in U.S. Pat. Nos. 3,766,037 and 3,926,754.

A method of treating industrial waste water electrolytically in which the anode comprises one or more aluminum plates or rods, and the cathode comprises one or more iron plates, is disclosed in U.S. Pat. No. 3,783,114. In that patent, aluminum and iron hydroxides aggregate into floc, and adsorb the impurities in the waste water. Floc containing the adsorbed impurities is floated to the surface of the water by bubbles of hydrogen gas formed at the cathode, and is removed from the cell.

Electrodes in rod or plate form used in electrolytic cells to purify waste water tend quickly to become coated by slime generated during the electrolytic process. This results in increased electrical resistance, thereby decreasing the efficiency of the electrolytic treatment. Where aluminum electrodes are employed, the dissolved aluminum tends to form compounds with some of the pullutants in the waste water, forming a coating on the electrodes. In the case of iron electrodes, the iron tends to compound into iron oxides which deposit as a coating on the electrodes. Such "fouling" of the electrodes occurs rapidly in conventional electrolytic treating cells, due to the limited surface areas of the electrodes in plate or rod form. Attempts to overcome this problem have not been notably successful. Chemical wash solutions have been employed to clean the electrodes, and the use of acid solutions or the like in the cells also has been suggested. U.S. Pat. No. 3,769,186 proposes to solve the problem of slime accumulation on aluminum anodes by forming such anodes of an aluminum alloy.

U.S. Pat. No. 3,899,405 discloses a method of removing heavy metals from waste water, in which the cathode comprises a body of particles having tin surfaces. During electrolysis, heavy metal pollutants are deposited upon the particles which become coated and must be regenerated from time to time.

SUMMARY OF THE INVENTION

The present invention provides methods and means for treating waste water electrolytically which is comparatively inexpensive, and which is effective in removing impurities to such extent that the water can be safely reused or dumped into a natural water supply. Further, the present invention minimizes the detrimental effects of slime accumulation on the electrodes.

In accordance with the present invention, a treating chamber operable as an electrolytic cell is provided, having an aluminum anode and an iron cathode. Both the aluminum and the iron are in small particulate form, to provide electrodes having relatively large surface areas in comparison to the quantity of electrolyte utilized. The quantities of particulate aluminum and particulate iron are not mixed, but are placed in close proximity to each other in the treating chamber. The aluminum and iron particles are arranged in the chamber so that additional particulate aluminum and particulate iron can be added as desired or required. Waste water or clean water containing dissolved solids is utilized as the electrolyte. An electric current is applied to the electrodes to dissolve aluminum and iron, and generate floc in the treating chamber. Waste water is mixed with the floc, either in the treating chamber or in another chamber to which the floc is conducted. The floc adsorbs the impurities in the waste water. Thereafter, the floc containing the adsorbed impurities is separated from the water.

The effectiveness of the treating process of the present invention is enhanced by increasing the surface areas of the aluminum and iron electrodes for greater exposure to the water in the treating chamber. It therefore is preferable for the aluminum and iron to be in small particulate form and loosely arranged in the treating chamber, whereby the water is constantly exposed to the relatively large surface areas presented by the aluminum and iron particles. By thus providing for relatively large amounts of electrode surface area, the detrimental effects of slime accumulation on the electrodes are minimized.

The floc containing the adsorbed impurities may be separated from the water mechanically, as by filtration, clarification or other conventional means. If waste petroleum by-products are present, they may be removed mechanically from the waste water and deposited in an adsorption chamber. The floc separated from the water may be pumped to the adsorption chamber for admixture with and adsorption by the petroleum by-products therein. The petroleum by-products then can be recycled in accordance with conventional practices without any apparent adverse effect resulting from the adsorbed impurities. Thus, a convenient means is provided for disposing of the impurities separated from the water.

The waste water may be treated in a batch process, in which case it is recirculated between a floc-generating treating chamber and a holding chamber for a predetermined time until substantially all impurities have been adsorbed by the floc, whereupon the water and floc are separated as described above. Additionally, the waste water may be treated in a continuous process in which the aluminum and iron particles are contained interiorly of one or more treating units through which waste water passes continuously at a predetermined flow rate, depending upon the surface areas of the aluminum and iron, the voltage potential imposed across the aluminum and iron, and the amount of impurities in the waste water being processed.

In a modification of the invention, clean water containing the normal dissolved solids may be introducted into the floc-generating treating chamber. Floc-laden clean water then is conveyed to a chamber containing waste water, and mixed therewith. The floc containing impurities adsorbed from the waste water subsequently is separated from the water as described above. The modified arrangement may be carried out either as a batch or continuous process.

DESCRIPTION OF THE PREFERRED EMBODIMENTS

Figure 1:
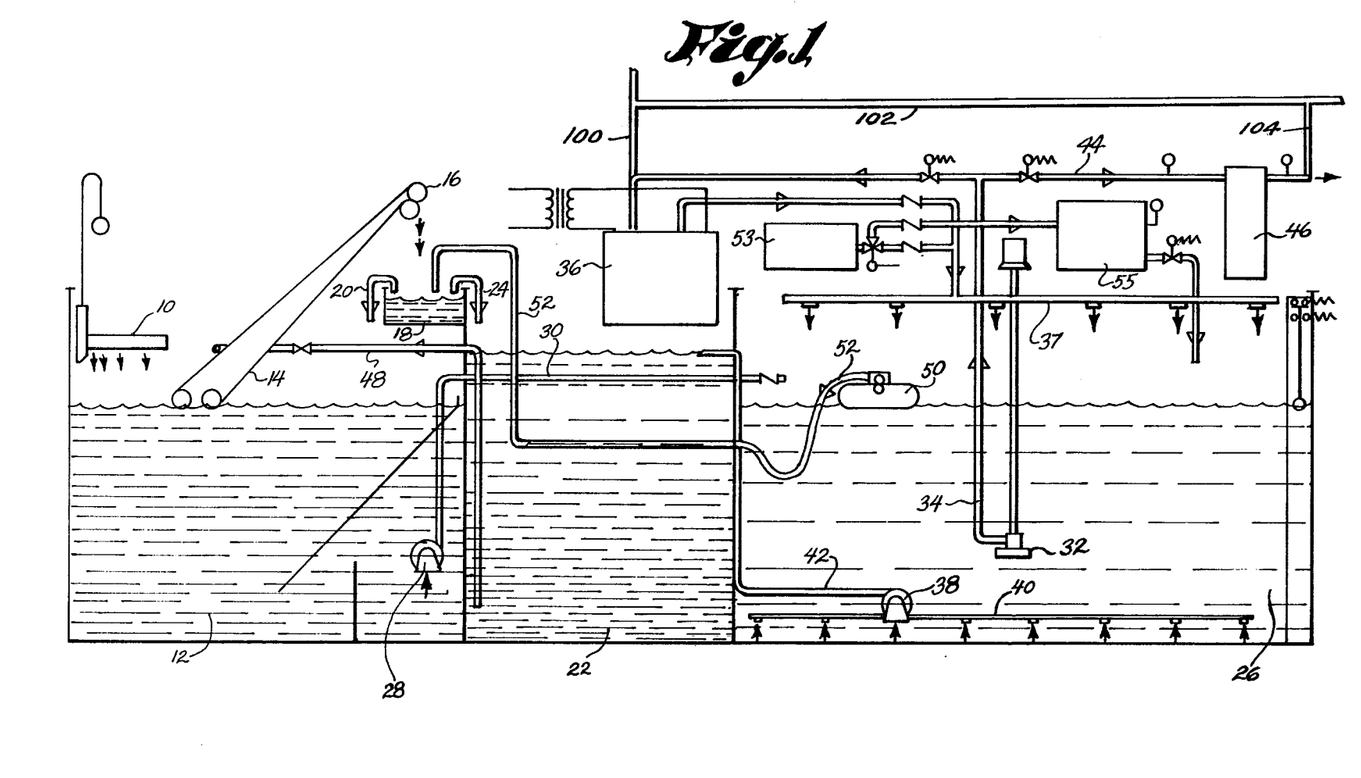
FIG. 1 is a diagrammatic view of a preferred treatment system utilizing the present invention.

FIG. 1 illustrates in diagrammatic form, a preferred embodiment of the present invention for purifying waste water having a high concentration of petroleum waste products, such as would be obtained, for example, from a machinery cleaning operation where the polluted effluent consists principally of acid, alkali, petroleum-based oil and grease, solvents and various heavy metals. The waste water is fed at a controlled rate through an inlet dispenser 10 into a conditioning chamber 12 where the oil and grease rise to the top of the chamber. An endless absorbing belt 14, preferably made from a treated 9-ounce woven jute fiber cloth, is positioned with a horizontal reach near the surface of the waste water in the conditioning chamber 12. Belt 14 is continuously operated to absorb the oil and grease at the water surface, and is passed through the nip of rollers 16 to squeeze oil, grease and water into a separator compartment 18. The difference in specific gravity between the petroleum by-products and water picked up by the belt 14 causes them to separate in the compartment 18. The water is returned to the conditioning tank 12 by conduit 20, and the petroleum by-products are conveyed to a recovery or adsorption chamber 22 through conduit 24.

The petroleum by-products usually are of droplet size, approximately twenty microns and larger. The petroleum by-products in the recovery chamber 22 rise to the top, leaving at the bottom waste water capable of being treated. A conduit 48 may be provided, having an inlet end near the bottom of recovery chamber 22 and an outlet end over the conditioning chamber 12, whereby the water at the bottom of chamber 22 can be conveyed to the conditioning chamber 12.

When the waste water in the conditioning tank 12 is sufficiently prepared, it is transferred to a holding chamber 26 by a transfer pump 28 and its associated conduit 30. A circulating pump 32 located near the bottom of the holding chamber 26 pumps the water through conduit 34 into a treating chamber 36, operating as a floc-generating electrolytic cell, where impurities in the water are adsorbed by floc. In this instance, the waste water functions as the electrolyte. The water and floc containing impurities adsorbed from the water are returned to the holding chamber 26 through conduit 37. Circulation of the waste water between the holding chamber 26 and the electrolytic treating chamber 36 continues for a period of time sufficient to permit the impurities in the entire volume of waste water to be adsorbed by floc generated in the chamber 36. Circulation then is discontinued, permitting floc containing adsorbed impurities to settle to the bottom of the holding chamber 26. A return pump 38 having an extended inlet conduit 40 disposed adjacent the bottom of holding chamber 26 is operated to convey the settled impurity-laden floc from the chamber 26 through outlet conduit 42 to the recovery chamber 22.

The contaminated floc, which has an affinity to oil, is adsorbed by the petroleum by-products in recovery chamber 22. The petroleum by-products with the adsorbed floc then are removed from the recovery chamber 22 for conventional reprocessing or disposal.

During the electrolysis, hydrogen gas is generated at the cathode in the treating chamber 36. The hydrogen is released to the atmosphere, but some may attach itself in bubble form to floc generated in chamber 36. The floc to which the hydrogen bubbles are attached rises in the holding chamber 26 to the surface of the waste water therein. The impurity-laden floc floating on the surface of the water in chamber 26, and any oil and grease also present, may be removed by any suitable means, such as a conventional skimmer 50 and conduit 52, either to the separator compartment 18, as shown, or to the recovery chamber 22.

After the impurity-laden floc has been removed from the holding chamber 26, the water remaining in the chamber, such water now being remarkably free of impurities, is conveyed by pump 32 through a discharge conduit 44 to any desired point, such as to a reservior from which it can later be reused, or to an existing water sewage discharge system.

Instead of separating the floc and pumping it to the recovery chamber 22, it also is possible to pump the treated water through a conventional mechanical filter to remove the floc. For example, a filter 46 may be disposed in the discharge conduit 44 to remove the floc containing the adsorbed impurities.

In either arrangement, the purified water discharged from conduit 44 is generally clear, colorless and odorless, and meets existing regulations relating to the permissible discharge of water.

If desired, an air compressor 53 may be provided for aerating the water passing through conduit 37, and for pressurizing a conventional pH adjuster 55. The latter operates to maintain the pH of the water in holding chamber 26 within a predetermined range (e.g. 6-10 pH), either by adding an acid solution to lower the pH or by adding an alkaline solution to raise the pH.

Figures 2, 3, 4:
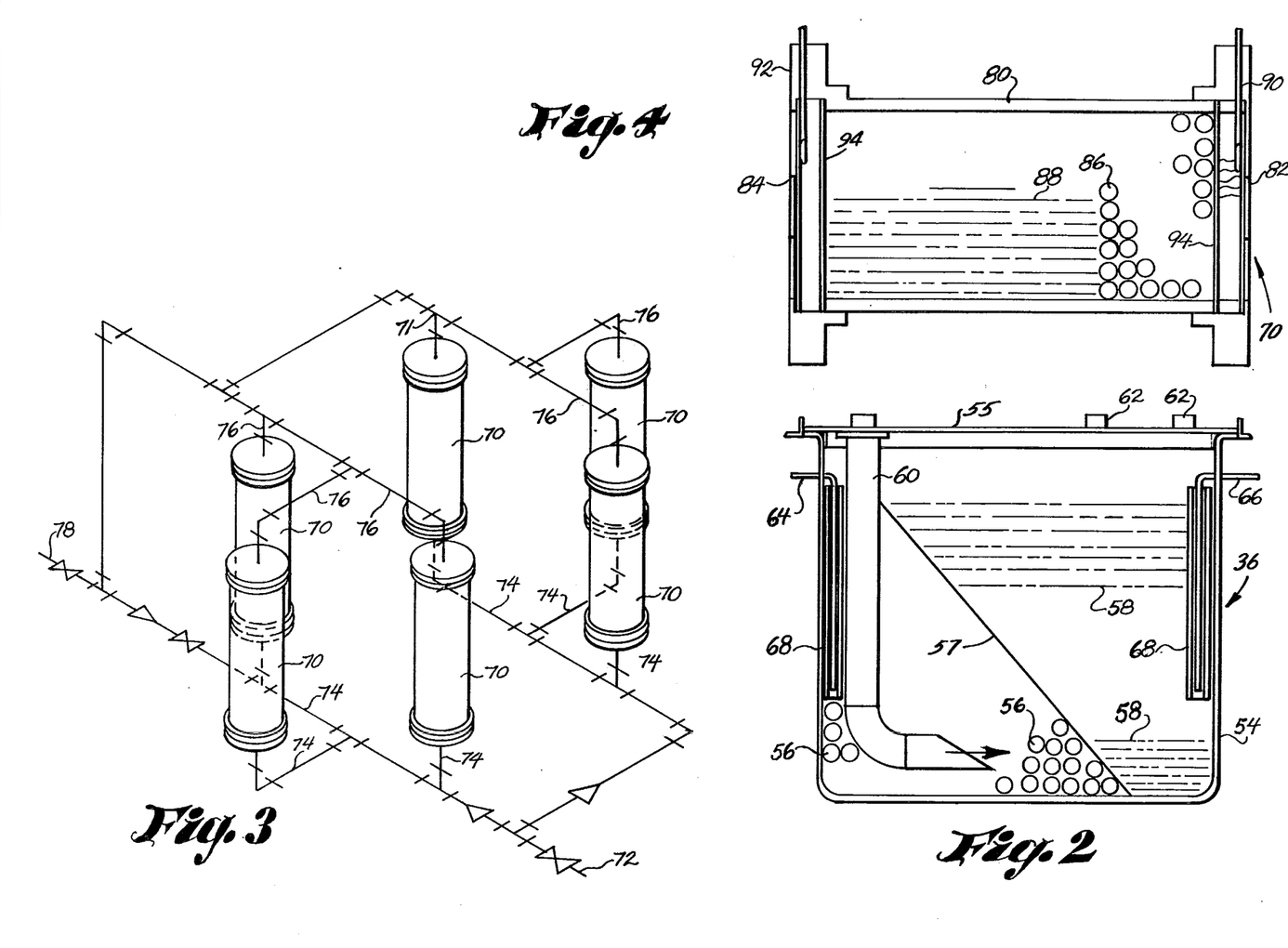
FIG. 2 is an elevation view of a treating chamber used in the batch processing of waste water according to the present invention.
FIG. 3 is a diagrammatic view of a system for treating waste water in a continuous flow-through process according to the present invention.
FIG. 4 is an elevation view of one of the treating chambers included in the system illustrated in FIG. 3.

The treating chamber 36 is illustrated in greater detail in FIG. 2. It includes a containing wall 54 in which a quantity of iron particles 56 is arranged in close proximity to a quantity of aluminum particles 58. A small gap, preferably on the order of about 0.05 mm, is maintained between the quantities of iron 56 and aluminum 58 in the chamber 36. The gap may be provided by a thin PVC screen 57. The separate quantities of iron and aluminum particles extend upwardly within the surrounding wall 54 substantially to the top thereof. A lid or cover 55, disposed at the top of wall 54, is removable to permit access to the iron 56 and aluminum 58, whereby additional quantities of each may be added as desired or required.

The total volume of the iron 56 and the aluminum 58 is less than the total volume of the treating chamber 36, to provide an adequate space to be filled by the waste water during its processing in that chamber. As previously explained, the treating chamber 36 is operable as an electrolytic cell in which the aluminum 58 is the anode, the iron 56 the cathode and the water the electrolyte. Since efficient and continuous processing of the waste water in the treating chamber 36 is enhanced by increasing the surface areas of the iron 56 and aluminum 58, both preferably are in small particulate form and loosely arranged. The iron cathode 56 comprises small ball-like elements of sponge or porous iron slag approximately 0.5 to 1.0 centimeters in diameter. In practice, such sponge iron balls do not coat as rapidly with an iron oxide slime or sludge, during electrolytic treatment, as do other forms of iron. The aluminum anode 58 preferably comprises shredded aluminum, such as scrap shavings obtained during the machining of aluminum parts.

The treating chamber 36 also includes an inlet conduit 60 extending to a location near the bottom thereof, and outlets 62 located at the top thereof. A first electrode or probe 64, which may be an iron rod, extends into treating chamber 36 through the wall 54 to a position within the confines by the iron particles 56. A second electrode or probe 66, which may be an aluminum rod, extends to a position within the confines of the aluminum particles 58. The probes 64, 66 may extend into direct contact with the iron 56 and aluminum 58, respectively. However, it is preferred to provide a cylindrical sheath 68 about each of the probes 64, 66, to separate them from direct contact with the iron 56 and aluminum 58. This reduces the amperage in the treating chamber 36 when a voltage potential is imposed across the probes during processing of the waste water.

During processing, a direct current at a selected voltage is imposed upon the probes 64, 66. By reason of the dissolved solids present in the waste water, electric current flows from the aluminum anode 58 to the iron cathode 56. As a result, aluminum is dissolved at the anode to produce aluminum hydroxide floc and iron is dissolved at the cathode to produce ferrous hydroxide floc. As is well known, flocculent precipitates of aluminum and ferric hydroxide are excellent materials for adsorbing oil, grease, metals and other pollutants in water. If oxygen and/or oxidants, such as hexavalent chromium, are present in the waste water, some of the ferrous hydroxide will react with the oxygen to form ferric hydroxide floc. If carbonate or bicarbonate are present in the waste water, some ferrous carbonate or ferric carbonate floc also will be formed. Because of the generation of floc and hydrogen gas at the iron cathode 56, the pH of the waste water in the treating chamber 36 tends to increase or decrease to a value in the 8 to 10 range. At such pH range, most metal contaminants have a minimum solubility and hence are readily absorbed and retained by the aluminum and iron floc.

By providing electrodes having relatively large amounts of surface area relative to the volume of electrolyte, the detrimental effects of slime accumulation on the electrodes are minimized. The quantities of iron particles 56 and aluminum particles 58 may be in any relative amount, provided sufficient quantities of both electrode materials are available to generate both iron hydroxide and aluminum hydroxide (or iron carbonate and aluminum hydroxide) floc precipitates. The quantities of iron and aluminum particles may be arranged to provide an iron to aluminum volumetric ratio of approximately 30 to 70, and a weight ratio of approximately 75 to 25. Other comparative volumetric and weight ratios will work, but contaminant removal levels may not be quite as high, and power consumption may increase somewhat, because of increased slime coating of the electrodes or increased over-voltage at one of the electrodes.

It has been found that iron and aluminum particles in the treating chamber 36 provide considerably better results than other metals. Tests reveal that the use of particulate aluminum alone, without iron, will form some aluminum floc and remove some impurities (e.g. copper) by plating, but a great many impurities will remain in the water. Likewise, when particulate iron is used alone, it oxidizes and the oxides produced react chemically to eliminate some impurites, generally the same impurities eliminated by the use of aluminum alone. On the other hand, when particulate iron and particulate aluminum are used together, as described above, the total number of impurities removed from the waste water substantially exceeds the combined total of impurities removed when particulate iron and particulate aluminum are used separately.

For example, in a typical operation using a system such as that represented in FIGS. 1 and 2, the treating chamber 36 will contain thirty-two cubic feet of particulate aluminum and iron, at a ratio of 70% aluminum and 30% iron by volume, and 120 volts is imposed across the electrodes 64, 66. Seven thousand gallons of typically polluted water may then be processed as set forth above in a cycle time of about ten hours, although it will be apparent that the exact cycle time will vary in accordance with a number of factors, including the concentration of impurities in the water. Additionally, the cycle time for a given effluent may be reduced by increasing the volume of iron and aluminum or by increasing the applied voltage.

Laboratory tests which analyze samples of polluted water, before and after processing by the present invention, indicate that a remarkably high percentage of impurities are removed by the process and apparatus of the present invention, particularly heavy metals. For example, one such laboratory test conducted on the effluent of a manufacturing and rebuilding plant revealed the following results, such test being conducted in accordance with American Public Health Association (APHA) Standard Methods, 14th Edition, Section 301 Ca:

| Sample | Analysis | |
|---|---|---|
| | Before | After |
| pH | 10.9 | 7.9 |
| | (Parts per million) | |
| Color | 800 | 10 |
| COD | 4800 | 224 |
| $BOD_5$ | 240 | 58 |
| Oil and Grease | 8760 | 0.4 |
| Total Solids | 8644 | 508 |
| Total Suspended Solids | 2594 | 12 |
| Volatile Solids | 7244 | 354 |
| Inorganic Solids | 1220 | 154 |
| Alkalinity | 750 | 192 |

| Metals | Analysis | |
|---|---|---|
| | Before | After |
| Lead | 24.0 | 0.010 |
| Cadmium | 0.32 | None Detected |
| Copper | 6.36 | None Detected |
| Zinc | 11.10 | 0.04 |
| Chromium | 0.8 | None Detected |
| Nickel | 0.235 | None Detected |
| Calcium | 46.5 | 10.0 |
| Manganese | 2.5 | None Detected |
| Cobalt | None Detected | None Detected |
| Iron | 65.0 | None Detected |
| Mercury | 10.1 ppb | <0.5 |
| Fluoride | 1.1 | 0.415 |
| Phosphates | 3.8 | 1.1 |
| Magnesium | 6.9 | 0.133 |

In accordance with another embodiment of the invention, waste water may be processed in the continuous, flow-through system illustrated in FIGS. 3 and 4. In such system, a plurality of treating units 70 are provided, each being arranged to accommodate a divided, parallel or series flow of waste water therethrough. A main inlet conduit 72 feeds to a network of secondary inlet conduits 74 each leading to one end of each of the treating units 70. The other end of each treating unit 70 is in series with another unit 70 or is connected to one of several secondary outlet conduits 76, which are arranged in a network feeding to the main outlet conduit 78. The plurality of treating units 70 are identical, and, as illustrated in FIG. 4, include a cylindrical housing 80 having an inlet opening 82 at one end thereof, and an outlet opening 84 at the other end thereof. Loosely arranged iron particles 86 are located at one end of the housing 80 in close proximity to loosely arranged aluminum particles 88 disposed at the other end of the housing 80. A pair of probes 90, 92 extend through the housing 80 to position within the confines of the iron cathode 86 and the aluminum anode 88, respectively, the probes 90, 92 preferably being surrounded by cylindrical sheaths 94. The iron particles 86 and the aluminum particles 88 have a comparative volumetric ratio of 30 to 70. The total volume of the iron and aluminum is less than the volume of the housing 80 so that waste water to be processed is readily accommodated within the housing 80.

Waste water is caused to flow through the main inlet conduit 72 where it divides into the plurality of secondary inlet conduits 74, and then flows through the treating units 70 at a predetermined flow rate. A suitable electrical potential is imposed across the probes 90, 92. The impurities in the waste water flowing across the iron particles 86 and the aluminum particles 88 are adsorbed by the floc generated in the units 70. The impurity-laden floc and the treated water discharge through the outlet conduits 76, 78. The floc may then be separated from the water in any desired manner, as described above.

Effective treatment of a given volume of waste water depends upon a number of variables, including the concentration of impurities in the water, the volume of aluminum and iron present in the treating units 70 and the exposed surface areas of such aluminum and iron, the electrical potential imposed upon the probes 90, 92, and the flow rate of the water through the treating units 70. It is possible, also, to increase the number of treating units 70, thereby increasing the volume of iron and aluminum available for treating the waste water.

In a modification of the invention, clean water containing normal dissolved solids is introduced into the electrolytic treating chamber or chambers to generate floc therein. The floc-laden clean water then is conveyed to a chamber containing waste water, and mixed therewith. Thereafter, the floc containing impurities adsorbed from the waste water is separated from the treated water. The clean water utilized in such modification may be either tap water or previously treated waste water.

Referring back to FIG. 1, clean tap water may be introduced into the treating chamber 36 through conduit 100. In this arrangement, the tap water is utilized as the electrolyte in treating chamber 36 and the waste water in holding chamber 26 is not circulated. A direct current of selected voltage is imposed upon the electrodes of treating chamber 36, whereby the aluminum and iron therein are dissolved to produce floc. Floc-laden water is conducted through conduit 37 to the holding chamber 26, and mixed with the waste water in that chamber. To facilitate the mixing, conventional stirring means (not shown) such as mechanical or pneumatic means may be utilized. A sufficient quantity of tap water is utilized to produce sufficient floc to adsorb the impurities in the entire volume of waste water in holding chamber 26. Thereupon, the floc containing the adsorbed impurities may be separated from the waste water in holding chamber 26 in the manner previously described.

If desired, previously treated waste water may be utilized in carrying out the modified process just described. In such event, treated waste water may be conducted from a reservoir (not shown) by means of conduit 102 to conduit 100, for delivery to treating chamber 36. Alternately, a selected quantity of treated waste water may be withdrawn directly from conduit 44, and conducted through conduits 104, 102 and 100 to treating chamber 36.

Figure 5:
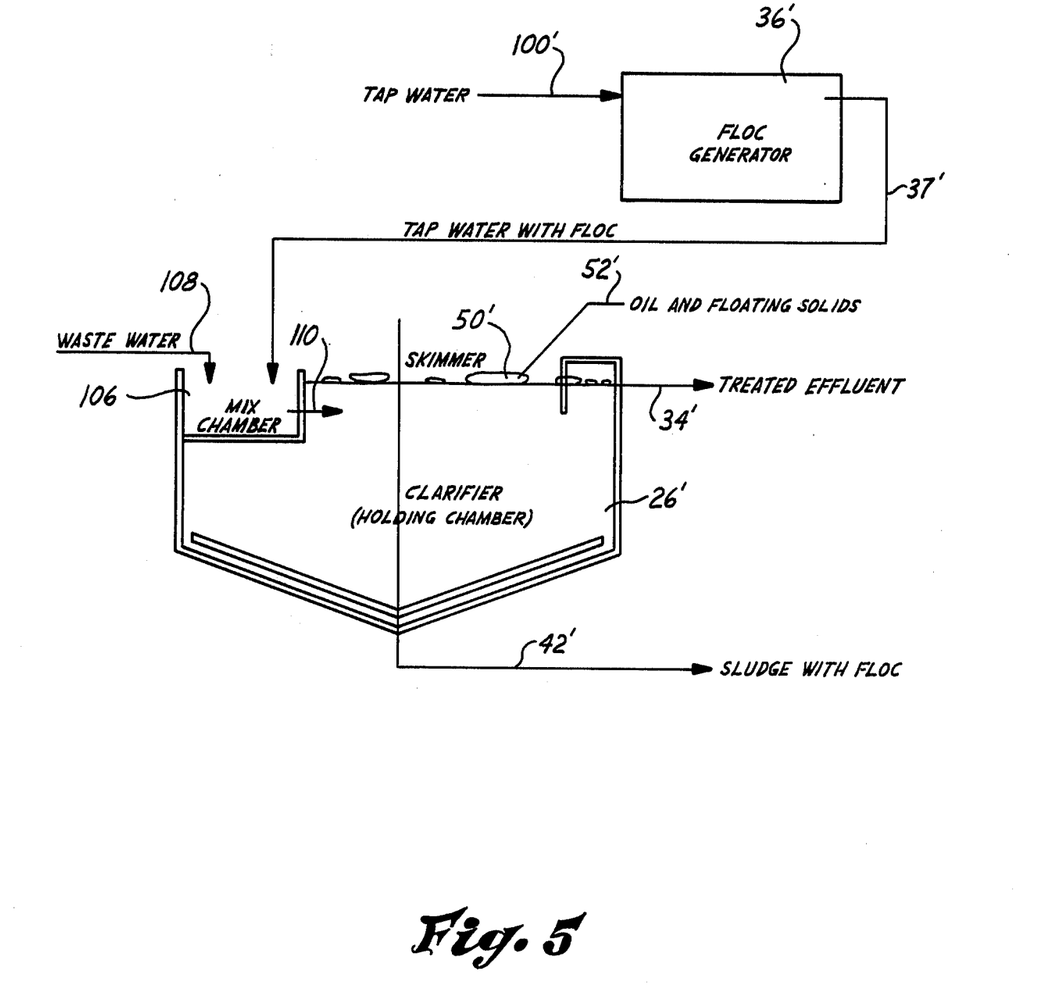
FIG. 5 is a fragmentary diagrammatic view of a modified treatment system utilizing the present invention.

The foregoing modified process, using clean water, may be carried out continuously, in accordance with the arrangement illustrated in FIG. 5. In such arrangement, tap water containing normal dissolved solids is introduced continuously through conduit 100' into a treating chamber 36', operating as a floc-generating electrolytic cell. Floc-laden clean water is conducted continuously through conduit 37' to a mixing chamber 106. Waste water to be treated is introduced continuously into mixing chamber 106 through conduit 108. The floc-laden clean water and waste water are mixed continuously in the mixing chamber and conveyed by conduit 110 to holding chamber 26', where the floc containing impurities adsorbed from the waste water is removed continuously. If desired, the mixing of the waste water and floc-laden clean water in mixing chamber 106 may be enhanced by physical agitation, utilizing conventional mechanical or pneumatic stirring means (not shown).

The floating impurity-laden floc is removed from chamber 26' by skimmer 50' through conduit 52', while the heavier impurity-laden floc, settling to the bottom of holding chamber 26', is removed through conduit 42'. The treated water is removed continuously from holding chamber 26' through conduit 34'. The floc containing the impurities adsorbed from the waste water may be transferred to an adsorption chamber containing previously separated petroleum by-products, such as recovery chamber 22.

In the continuous, flow-through system illustrated in FIGS. 3 and 4, clean water containing normal dissolved solids may be introduced into the several treating units 70 (in parallel or series) through conduits 72, 74, and the floc-laden clean water continuously transferred from the treating units 70 via conduits 76, 78 to a holding chamber, where it is mixed continuously with an incoming supply of waste water for purification in accordance with this invention.

Thus, whether a batch processing operation or a continuous operation is used, the present invention provides a treatment system which is remarkably effective in removing substantially all harmful impurities from industrial waste water, leaving it generally clean, colorless, odorless, and suitable for dumping into existing water discharge systems without adverse effect on the environment. Moreover, the present invention provides a treating operation which is comparatively inexpensive to install and operate, and which has comparatively low maintenance requirements.

The present invention has been described in detail for the purpose of illustration only and is not intended to be limited by such description, nor otherwise deemed to exclude any variation or equivalent arrangement that would be apparent from, or reasonably suggested by, the foregoing disclosure to one skilled in the art.

In the appended claims, the terminology "water containing dissolved solids" includes, but is not limited to, waste water, tap water and treated waste water from which impurities have been removed. The terminology "clean water" indicates water containing normal dissolved solids, including tap water and treated waste water from which impurities have been removed.

I claim:

1. In apparatus for treating waste water electrolytically, a treating chamber operable as an electrolytic cell wherein:
   (a) the anode is particulate aluminum,
   (b) the cathode is particulate iron disposed in close proximity to the aluminum,
   (c) water containing dissolved solids is utilized as the electrolyte and
   (d) electrical means is connected to the aluminum anode and the iron cathode for applying an electric current to the anode and cathode to dissolve the aluminum and iron and produce floc in the treating chamber.

2. The apparatus of claim 1, wherein the particulate aluminum is in the form of aluminum shavings and the particulate iron is in the form of small ball-like elements of porous iron, said aluminum shavings and porous iron elements being loosely arranged in the treating chamber, whereby the anode and cathode have large surface areas relative to the volume of electrolyte.

3. The apparatus of claim 2, wherein the particulate iron comprises sponge iron balls approximately 0.5 to 1.0 centimeters in diameter.

4. The apparatus of claim 2, wherein:
   (a) the iron and aluminum occupy a volume less than the volume of the treating chamber and
   (b) the iron and aluminum have a comparative volumetric ratio of 30 to 70.

5. The apparatus of claim 2, wherein:
   (a) the iron and aluminum occupy a volume less than the volume of the treating chamber and
   (b) the iron and aluminum have a comparative weight ratio of approximately 75 to 25.

6. The apparatus of claim 1, further including:
   (a) inlet means for introducing water into the treating chamber and
   (b) outlet means for discharging floc and water from the treating chamber.

7. The apparatus of claim 6, further including:
   (a) conduit means for conveying waste water to the treating chamber,
   (b) a holding chamber,
   (c) conduit means for conveying waste water and floc containing impurities adsorbed from the waste water from the treating chamber to the holding chamber and
   (d) means associated with the holding chamber for separating floc containing adsorbed impurities from the waste water in said chamber.

8. The apparatus of claim 7, further including:
   (a) an adsorption chamber having a quantity of petroleum by-products therein and
   (b) conduit means for conveying floc containing adsorbed impurities from the holding chamber to the adsorption chamber.

9. The apparatus of claim 6, further including:
   (a) conduit means for conveying clean water to the treating chamber,
   (b) a holding chamber for containment of waste water,
   (c) conduit means for conveying floc-laden clean water from the treating chamber to the holding chamber for mixture with the waste water in the holding chamber and
   (d) means associated with the holding chamber for separating floc containing impurities adsorbed from the waste water from the water in said chamber.

10. The apparatus of claim 9, further including:
    (a) an adsorption chamber having a quantity of petroleum by-products therein and
    (b) conduit means for conveying floc containing adsorbed impurities from the holding chamber to the adsorption chamber.

11. The apparatus of claim 6, further including:
    (a) conduit means for conveying clean water to the treating chamber,
    (b) a mixing chamber,
    (c) conduit means for conveying waste water to the mixing chamber,
    (d) conduit means for conveying floc-laden clean water from the treating chamber to the mixing chamber for mixture with waste water in the mixing chamber,
    (e) a holding chamber,
    (f) conduit means for conveying waste water and floc containing impurities adsorbed from the waste water from the mixing chamber to the holding chamber and (g) means associated with the holding chamber for separating floc containing adsorbed impurities from the water in said chamber.

12. The apparatus of claim 6, further characterized in that a plurality of treating chambers are arranged in a parallel flow system and conduit means are provided to divide incoming water to flow through each of said treating chambers at a predetermined flow rate.

13. Apparatus for removing impurities from polluted water, said apparatus including:
(a) a treating chamber having a quantity of aluminum and a quantity of iron contained therein, said aluminum and said iron being arranged in proximate relationship and occupying a volume less than the volume of said treating chamber, said quantities of aluminum and iron in said treating chamber being in small particulate form;
(b) inlet means for introducing said polluted water into said treating chamber for treating therein;
(c) first electrically conducting means arranged to extend within the confines of said quantity of aluminum;
(d) second electrically conducting means arranged to extend within the confines of said quantity of iron;
(e) means for imposing an electrical potential across said first and second electrically conducting means to thereby cause impurities in said polluted water to be precipitated; and
(f) means for separating said precipitated impurities from the remaining water.

14. Apparatus for removing impurities from polluted water as defined in claim 35, and further characterized in that said quantities of aluminum and iron are loosely arranged in said treating chamber.

15. Apparatus for removing impurities from polluted water as defined in claim 13, and further characterized in that said treating chamber includes outlet means leading therefrom, and in that said separating means includes a filter located in said outlet means.

16. Apparatus for removing impurities from polluted water as defined in claim 13, and further characterized in that said treating chamber includes outlet means, in that said separating means includes a holding chamber for receiving said precipitated impurities and said remaining water from said treating chamber outlet and for permitting said precipitated impurities to settle to the bottom of said holding chamber, and in that said holding chamber includes discharge means for removing said settled precipitated impurities therefrom.

17. Apparatus for removing impurities from polluted water as defined in claim 16, and further characterized in that said settling chamber discharge means is connected to an adsorption chamber having a quantity of liquid petroleum by-products therein.

18. Apparatus for removing impurities from polluted water as defined in claim 13, and further characterized in that the comparative volumetric ratio of said iron and said aluminum in said treating chamber is 30-to-70.

19. Apparatus for removing impurities from polluted water as defined in claim 13, and further characterized in that a plurality of treating chambers are arranged in a parallel flow system with said polluted water being divided to flow through said treating chamber at a predetermined flow rate.

* * * * *

UNITED STATES PATENT OFFICE
CERTIFICATE OF CORRECTION

PATENT NO. : 4,149,953
DATED : April 17, 1979
INVENTOR(S) : Stephen A. Rojo

It is certified that error appears in the above-identified patent and that said Letters Patent are hereby corrected as shown below:

Column 11, line 34, change "35" to --13--

*Signed and Sealed this*

*Seventh* Day of *August 1979*

[SEAL]

Attest:

*Attesting Officer*

LUTRELLE F. PARKER
*Acting Commissioner of Patents and Trademarks*